US006324509B1

(12) United States Patent
Bi et al.

(10) Patent No.: US 6,324,509 B1
(45) Date of Patent: Nov. 27, 2001

(54) METHOD AND APPARATUS FOR ACCURATE ENDPOINTING OF SPEECH IN THE PRESENCE OF NOISE

(75) Inventors: Ning Bi; Chienchung Chang; Andrew P. Dejaco, all of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/246,414

(22) Filed: Feb. 8, 1999

(51) Int. Cl.⁷ .................................................... G10L 15/04

(52) U.S. Cl. .......................... 704/248; 704/233; 704/251; 704/253; 704/254

(58) Field of Search .................................... 704/248, 233, 704/251, 253, 254–256, 257, 231, 244, 200; 379/58

(56) References Cited

U.S. PATENT DOCUMENTS

| | | | | |
|---|---|---|---|---|
| 4,567,606 | | 1/1986 | Vensko et al. | 381/43 |
| 4,731,811 | | 3/1988 | Dubus | 379/58 |
| 4,821,325 | * | 4/1989 | Martin et al. | 704/253 |
| 4,881,266 | * | 11/1989 | Nitta et al. | 704/248 |
| 4,945,566 | * | 7/1990 | Mergel et al. | 704/253 |
| 4,961,229 | | 10/1990 | Takahashi | 381/42 |
| 4,991,217 | | 2/1991 | Garrett et al. | 381/43 |
| 5,012,518 | | 4/1991 | Liu et al. | 381/42 |
| 5,040,212 | | 8/1991 | Bethards | 381/41 |
| 5,054,082 | | 10/1991 | Smith et al. | 381/42 |
| 5,109,509 | | 4/1992 | Katayama et al. | 395/600 |
| 5,146,538 | | 9/1992 | Sobti et al. | 395/2 |
| 5,212,764 | * | 5/1993 | Ariyoshi | 704/248 |
| 5,231,670 | | 7/1993 | Goldhor et al. | 381/43 |
| 5,280,585 | | 1/1994 | Kochis et al. | 395/275 |
| 5,305,422 | * | 4/1994 | Junqua | 704/253 |
| 5,321,840 | | 6/1994 | Ahlin et al. | 395/700 |
| 5,325,524 | | 6/1994 | Black et al. | 395/600 |
| 5,371,901 | | 12/1994 | Reed et al. | 455/69 |
| 5,414,796 | | 5/1995 | Jacobs et al. | 395/2.3 |
| 5,692,104 | * | 11/1997 | Chow et al. | 704/253 |
| 5,794,195 | * | 8/1998 | Hormann et al. | 704/253 |

FOREIGN PATENT DOCUMENTS

| | | | |
|---|---|---|---|
| 0108354 | 5/1984 | (EP) | G06F/15/16 |
| 0177405 | 4/1986 | (EP) . | |
| 0534410 | 3/1993 | (EP) | G01L/5/00 |

OTHER PUBLICATIONS 1994 2 IEEE Trans. On Speech and Audio Processing, "A Robust Algorithm for Word Boundary Detection in the Presence of Noise", J. Junqua et al., pp. 406–412.

1978 Digital Processing of Speech Signals, "Linear Predictive Coding of Speech", Rabiner et al., pp. 396–453, 1978.

1989 IEEE, "Efficient Encoding of Speech LSP Parameters Using the Discrete Cosine Transformation", Farvardin et al., pp. 168–171.

* cited by examiner

*Primary Examiner*—William Korzuch
*Assistant Examiner*—Vijay B Chawan
(74) *Attorney, Agent, or Firm*—Philip Wadsworth; Kent D. Baker; Thomas R. Rouse

(57) ABSTRACT

An apparatus for accurate endpointing of speech in the presence of noise includes a processor and a software module. The processor executes the instructions of the software module to compare an utterance with a first signal-to-noise-ratio (SNR) threshold value to determine a first starting point and a first ending point of the utterance. The processor then compares with a second SNR threshold value a part of the utterance that predates the first starting point to determine a second starting point of the utterance. The processor also then compares with the second SNR threshold value a part of the utterance that postdates the first ending point to determine a second ending point of the utterance. The first and second SNR threshold values are recalculated periodically to reflect changing SNR conditions. The first SNR threshold value advantageously exceeds the second SNR threshold value.

13 Claims, 6 Drawing Sheets

METHOD AND APPARATUS FOR ACCURATE ENDPOINTING OF SPEECH IN THE PRESENCE OF NOISE

BACKGROUND OF THE INVENTION

I. Field of the Invention

The present invention pertains generally to the field of communications, and more specifically to endpointing of speech in the presence of noise.

II. Background

Voice recognition (VR) represents one of the most important techniques to endow a machine with simulated intelligence to recognize user or user-voiced commands and to facilitate human interface with the machine. VR also represents a key technique for human speech understanding. Systems that employ techniques to recover a linguistic message from an acoustic speech signal are called voice recognizers. A voice recognizer typically comprises an acoustic processor, which extracts a sequence of information-bearing features, or vectors, necessary to achieve VR of the incoming raw speech, and a word decoder, which decodes the sequence of features, or vectors, to yield a meaningful and desired output format such as a sequence of linguistic words corresponding to the input utterance. To increase the performance of a given system, training is required to equip the system with valid parameters. In other words, the system needs to learn before it can function optimally.

The acoustic processor represents a front-end speech analysis subsystem in a voice recognizer. In response to an input speech signal, the acoustic processor provides an appropriate representation to characterize the time-varying speech signal. The acoustic processor should discard irrelevant information such as background noise, channel distortion, speaker characteristics, and manner of speaking. Efficient acoustic processing furnishes voice recognizers with enhanced acoustic discrimination power. To this end, a useful characteristic to be analyzed is the short time spectral envelope. Two commonly used spectral analysis techniques for characterizing the short time spectral envelope are linear predictive coding (LPC) and filter-bank-based spectral modeling. Exemplary LPC techniques are described in U.S. Pat. No. 5,414,796, which is assigned to the assignee of the present invention and fully incorporated herein by reference, and L. B. Rabiner & R. W. Schafer, *Digital of Speech Signals* 396–453 (1978), which is also fully incorporated herein by reference.

The use of VR (also commonly referred to as speech recognition) is becoming increasingly important for safety reasons. For example, VR may be used to replace the manual task of pushing buttons on a wireless telephone keypad. This is especially important when a user is initiating a telephone call while driving a car. When using a phone without VR, the driver must remove one hand from the steering wheel and look at the phone keypad while pushing the buttons to dial the call These acts increase the likelihood of a car accident. A speech-enabled phone (i.e., a phone designed for speech recognition) would allow the driver to place telephone calls while continuously watching the road. And a hands-free car-kit system would additionally permit the driver to maintain both hands on the steering wheel during call initiation.

Speech recognition devices are classified as either speaker-dependent or speaker-independent devices. Speaker-independent devices are capable of accepting voice commands from any user. Speaker-dependent devices, which are more common, are trained to recognize commands from particular users. A speaker-dependent VR device typically operates in two phases, a training phase and a recognition phase. In the training phase, the VR system prompts the user to speak each of the words in the system's vocabulary once or twice so the system can learn the characteristics of the user's speech for these particular words or phrases. Alternatively, for a phonetic VR device, training is accomplished by reading one or more brief articles specifically scripted to cover all of the phonemes in the language. An exemplary vocabulary for a hands-free car kit might include the digits on the keypad; the keywords "call," "send," "dial," "cancel," "clear," "add," "delete," "history," "program," "yes," and "no"; and the names of a predefined number of commonly called coworkers, friends, or family members. Once training is complete, the user can initiate calls in the recognition phase by speaking the trained keywords. For example, if the name "John" were one of the trained names, the user could initiate a call to John by saying the phrase "Call John." The VR system would recognize the words "Call" and "John," and would dial the number that the user had previously entered as John's telephone number.

To accurately capture voiced utterances for recognition, speech-enabled products typically use an endpoint detector to establish the starting and ending points of the utterance. In conventional VR devices, the endpoint detector relies upon a single signal-to-noise-ratio (SNR) threshold to determine the endpoints of the utterance. Such conventional VR devices are described in 2 *IEEE Trans. on Speech and Audio Processing, A Robust Algorithm for Word Boundary Detection in the Presence of Noise*, Jean-Claude Junqua et al., July 1994) and *TIA/EIA Interim Standard IS*-733 2-35 to 2-50 (March 1998). If the SNR threshold is set too low, however, the VR device becomes too sensitive to background noise, which can trigger the endpoint detector, thereby causing mistakes in recognition. Conversely, if the threshold is set too high, the VR device becomes susceptible to missing weak consonants at the beginnings and endpoints of utterances. Thus, there is a need for a VR device that uses multiple, adaptive SNR thresholds to accurately detect the endpoints of speech in the presence of background noise.

SUMMARY OF THE INVENTION

The present invention is directed to a VR device that uses multiple, adaptive SNR thresholds to accurately detect the endpoints of speech in the presence of background noise. Accordingly, in one aspect of the invention, a device for detecting endpoints of an utterance advantageously includes a processor; and a software module executable by the processor to compare an utterance with a first threshold value to determine a first starting point and a first ending point of the utterance, compare with a second threshold value a part of the utterance that predates the first starting point to determine a second starting point of the utterance, and compare with the second threshold value a part of the utterance that postdates the first ending point to determine a second ending point of the utterance.

In another aspect of the invention, a method of detecting endpoints of an utterance advantageously includes the steps of comparing an utterance with a first threshold value to determine a first starting point and a first ending point of the utterance; comparing with a second threshold value a part of the utterance that predates the first starting point to determine a second starting point of the utterance; and comparing with the second threshold value a part of the utterance that postdates the first ending point to determine a second ending point of the utterance.

In another aspect of the invention, a device for detecting endpoints of an utterance advantageously includes means for comparing an utterance with a first threshold value to determine a first starting point and a first ending point of the utterance; means for comparing with a second threshold value a part of the utterance that predates the first starting point to determine a second starting point of the utterance; and means for comparing with the second threshold value a part of the utterance that postdates the first ending point to determine a second ending point of the utterance.

PIG. 3 is a graph of signal amplitude of an utterance and first and second adaptive SNR thresholds versus time for various frequency bands.

Figure 1:
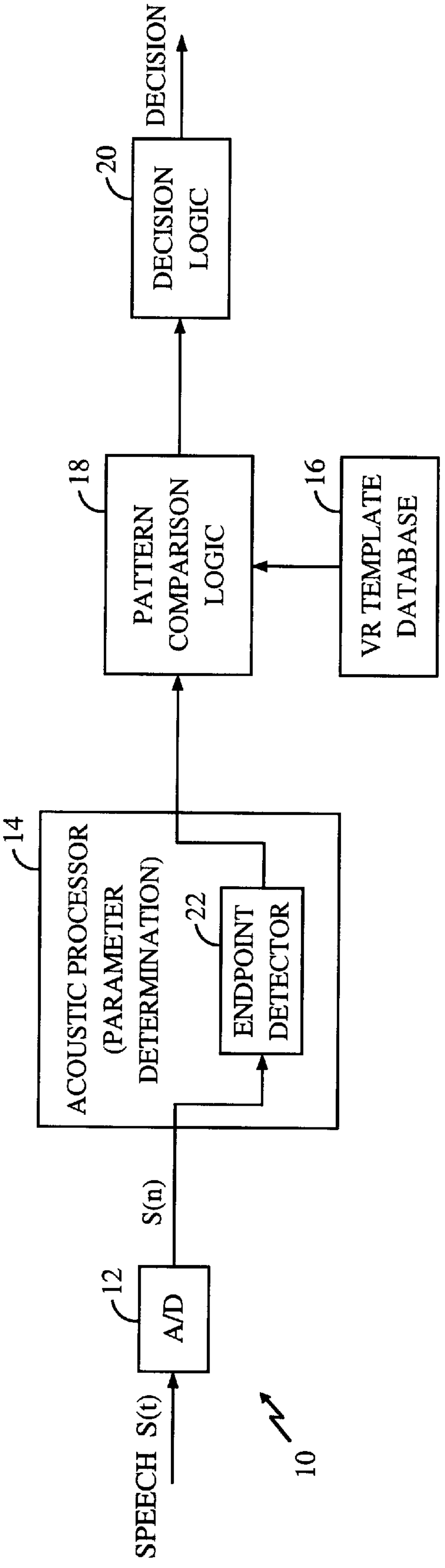
FIG. 1 is a block diagram of a voice recognition system.
Figure 4:
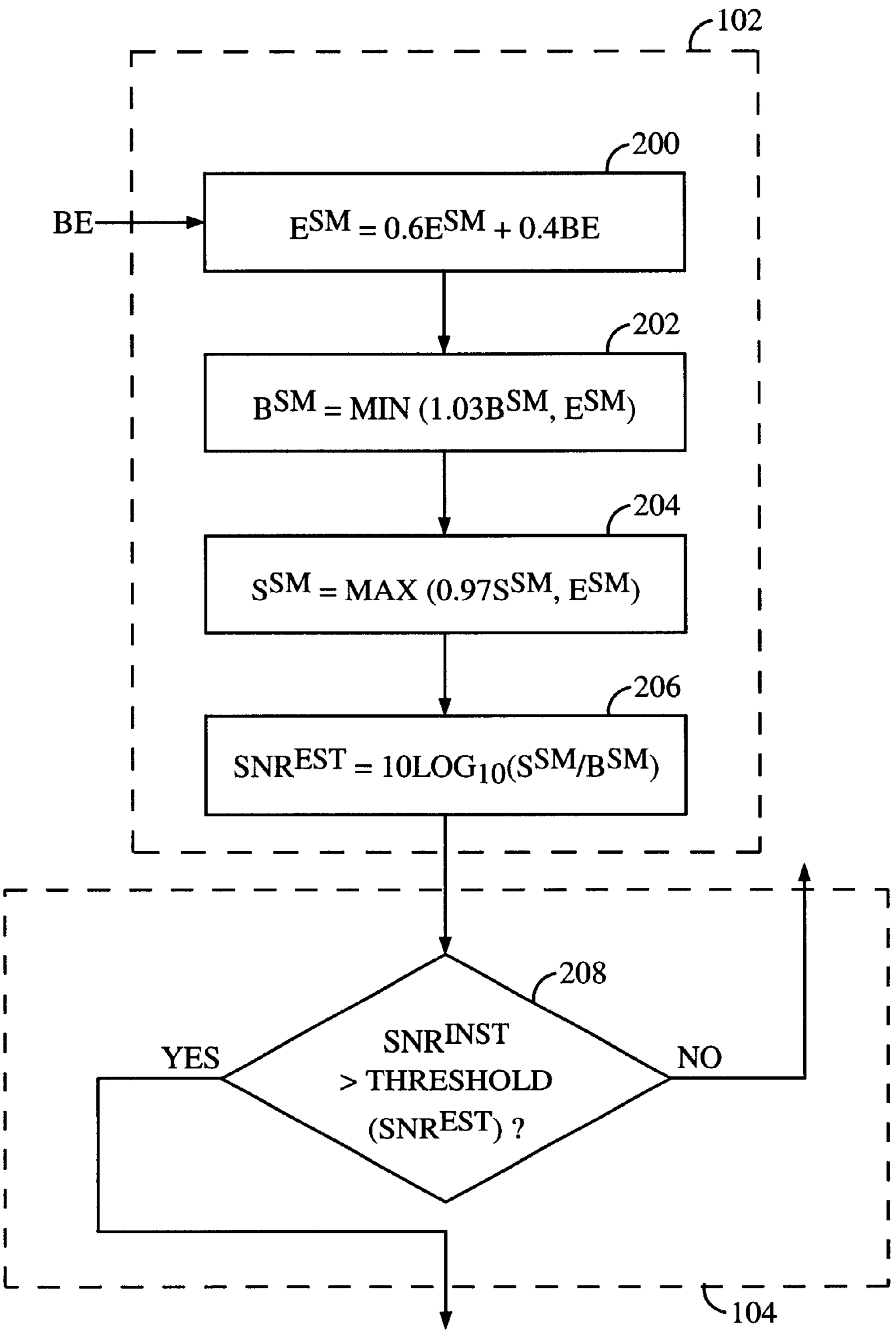

FIG. 4 is a flow chart illustrating method steps performed by a voice recognition system, such as the system of FIG. 1, to compare instantaneous SNR with an adaptive SNR threshold.

Figure 5:
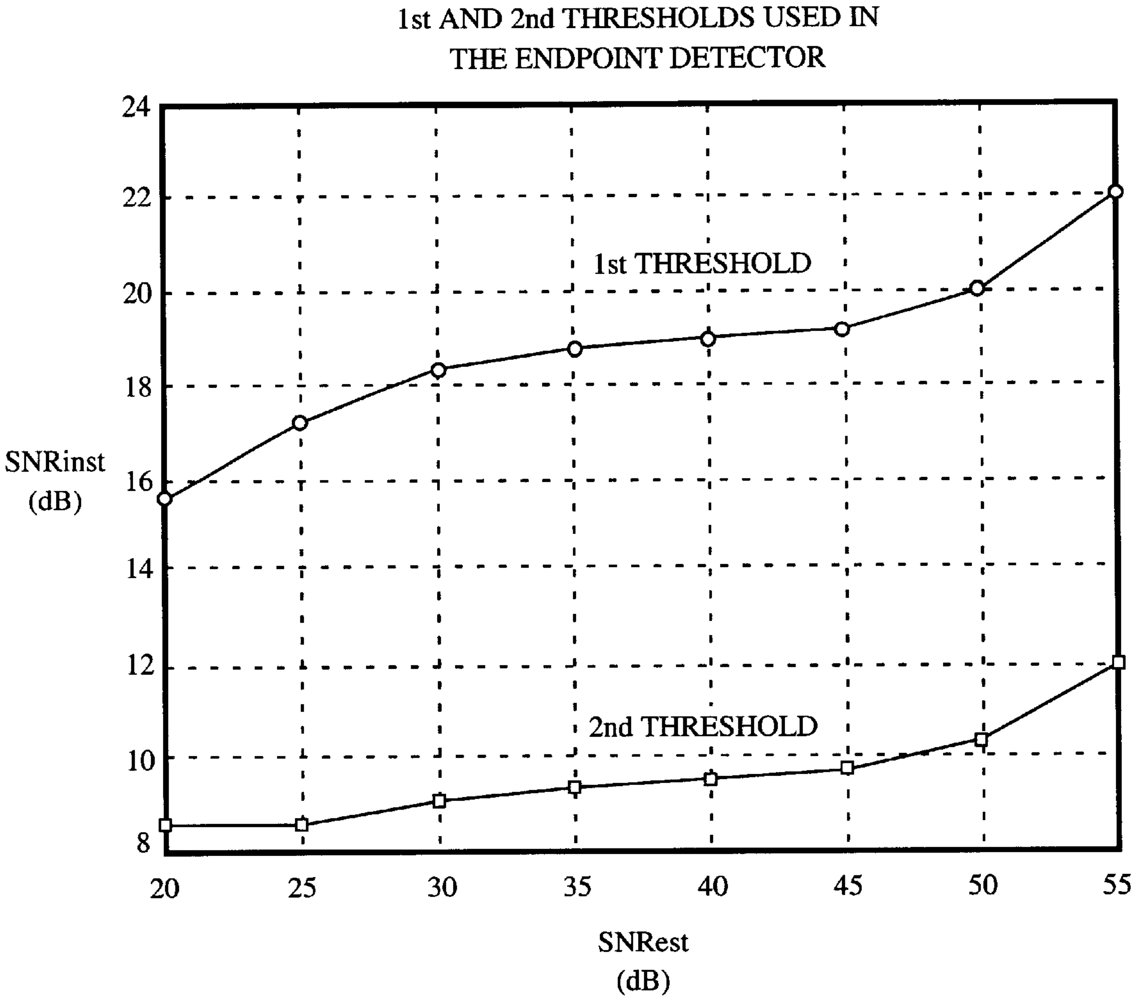

FIG. 5 is a graph of instantaneous signal-to-noise ratio (dB) versus signal-to-noise estimate (dB) for a speech endpoint detector in a wireless telephone.

Figure 6:
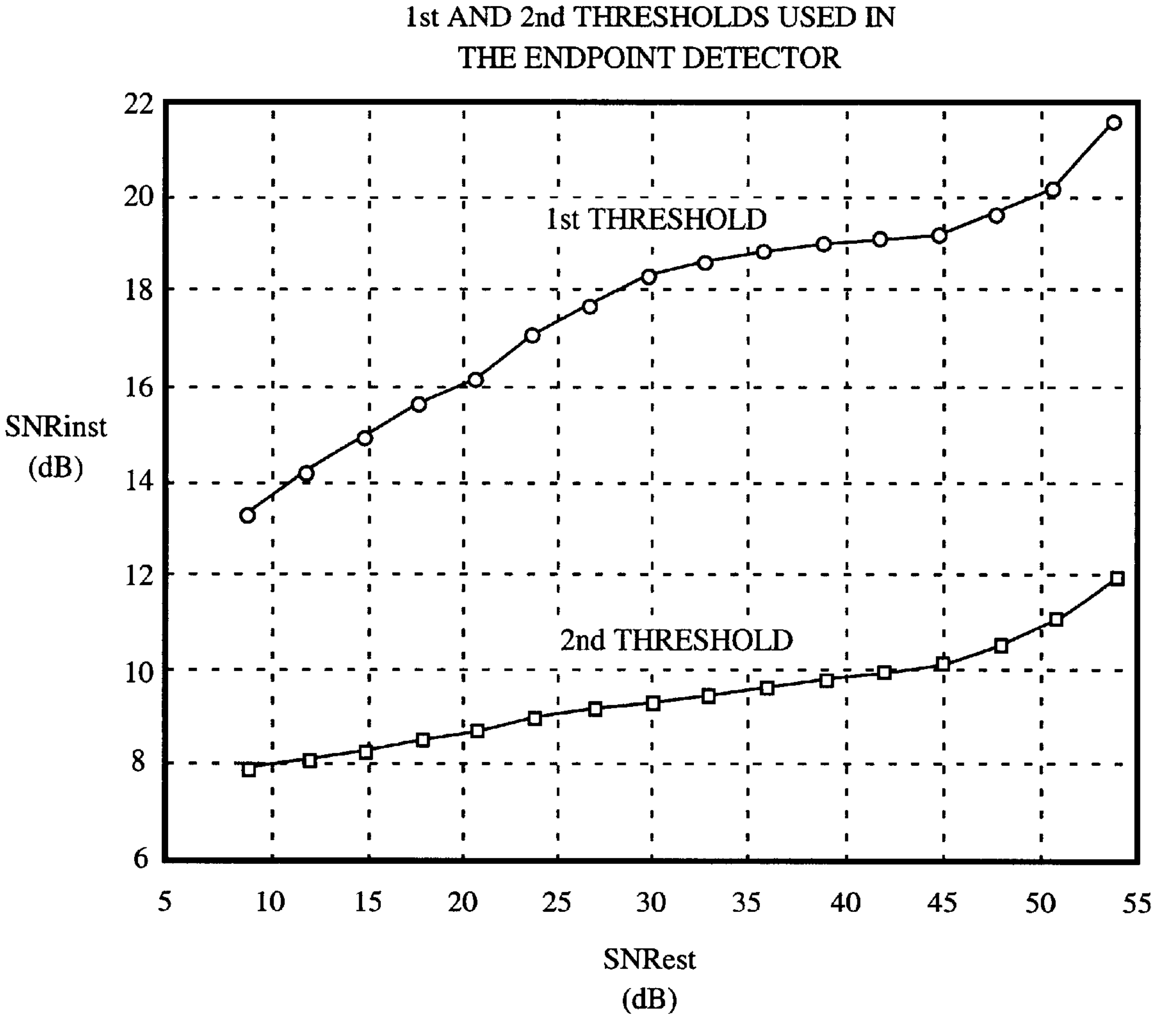

FIG. 6 is a graph of instantaneous signal-to-noise ratio (dB) versus signal-to-noise ratio estimate (dB) for a speech endpoint detector in a hands-free car kit.

DETAILED DESCRIPTION OF THE PREFERRED EMBODIMENTS

In accordance with one embodiment, as illustrated in FIG. 1, a voice recognition system 10 includes an analog-to-digital converter (A/D) 12, an acoustic processor 14, a VR template database 16, pattern comparison logic 18, and decision logic 20. The acoustic processor 14 includes an endpoint detector 22. The VR system 10 may reside in, e.g., a wireless telephone or a hands-free car kit.

When the VR system 10 is in speech recognition phase, a person (not shown) speaks a word or phrase, generating a speech signal. The speech signal is converted to an electrical speech signal s(t) with a conventional transducer (also not shown). The speech signal s(t) is provided to the A/D 12, which converts the speech signal s(t) to digitized speech samples s(n) in accordance with a known sampling method such as, e.g., pulse coded modulation (PCM).

The speech samples s(n) are provided to the acoustic processor 14 for parameter determination. The acoustic processor 14 produces a set of parameters that models the characteristics of the input speech signal s(t). The parameters may be determined in accordance with any of a number of known speech parameter determination techniques including, e.g., speech coder encoding and using fast fourier transform (FFT)-based cepstrum coefficients, as described in the aforementioned U.S. Pat. No. 5,414,796. The acoustic processor 14 may be implemented as a digital signal processor (DSP). The DSP may include a speech coder. Alternatively, the acoustic processor 14 may be implemented as a speech coder.

Parameter determination is also performed during training of the VR system 10, wherein a set of templates for all of the vocabulary words of the VR system 10 is routed to the VR template database 16 for permanent storage therein. The VR template database 16 is advantageously implemented as any conventional form of nonvolatile storage medium, such as, e.g., flash memory. This allows the templates to remain in the VR template database 16 when the power to the VR system 10 is turned off.

The set of parameters is provided to the pattern comparison logic 18. The pattern comparison logic 18 advantageously detects the starting and ending points of an utterance, computes dynamic acoustic features (such as, e.g., time derivatives, second time derivatives, etc.), compresses the acoustic features by selecting relevant frames, and quantizes the static and dynamic acoustic features. Various known methods of endpoint detection, dynamic acoustic feature derivation, pattern compression, and pattern quantization are described in, e.g., Lawrence Rabiner & Biing-Hwang Juang, *Fundamentals of Speech Recognition* (1993), which is fully incorporated herein by reference. The pattern comparison logic 18 compares the set of parameters to all of the templates stored in the VR template database 16. The comparison results, or distances, between the set of parameters and all of the templates stored in the VR template database 16 are provided to the decision logic 20. The decision logic 20 selects from the VR template database 16 the template that most closely matches the set of parameters. In the alternative, the decision logic 20 may use a conventional "N-best" selection algorithm, which chooses the N closest matches within a predefined matching threshold. The person is then queried as to which choice was intended. The output of the decision logic 20 is the decision as to which word in the vocabulary was spoken.

The pattern comparison logic 18 and the decision logic 20 may advantageously be implemented as a microprocessor. The VR system 10 may be, e.g., an application specific integrated circuit (ASIC). The recognition accuracy of the VR system 10 is a measure of how well the VR system 10 correctly recognizes spoken words or phrases in the vocabulary. For example, a recognition accuracy of 95% indicates that the VR system 10 correctly recognizes words in the vocabulary ninety-five times out of 100.

The endpoint detector 22 within the acoustic processor 14 determines parameters pertaining to the starting point and ending point of each utterance of speech. The endpoint detector 22 serves to capture a valid utterance, which is either used as a speech template in the speech training phase or compared with speech templates to find a best match in the speech recognition phase. The endpoint detector 22 reduces the error of the VR system 10 in the presence of background noise, thereby increasing the robustness of functions such as, e.g., voice dial and voice control of a wireless telephone. As described in detail below with reference to FIG. 2, two adaptive signal-to-noise-ratio thresholds are established in the endpoint detector 22 to capture the valid utterance. The first threshold is higher than the second threshold. The first threshold is used to capture relatively strong voice segments in the utterance, and the second threshold is used to find relatively weak segments in the utterance, such as, e.g., consonants. The two adaptive SNR thresholds may be appropriately tuned to allow the VR system 10 to be either robust to noise or sensitive to any speech segments.

In one embodiment the second threshold is the half-rate threshold in a 13 kilobit-per-second (kbps) vocoder such as the vocoder described in the aforementioned U.S. Pat. No. 5,414,796, and the first threshold is four to ten dB greater than the full rate in a 13 kbps vocoder. The thresholds are advantageously adaptive to background SNR, which may be estimated every ten or twenty milliseconds. This is desirable because background noise (i.e., road noise) varies in a car. In one embodiment the VR system 10 resides in a vocoder of a wireless telephone handset, and the endpoint detector 22 calculates the SNR in two frequency bands, 0.3–2 kHz and 2–4 kHz. In another embodiment the VR system 10 resides in a hands-free car kit, and the endpoint detector 22 calculates the SNR in three frequency bands, 0.3–2 kHz, 2–3 kHz, and 3–4 kHz.

Figure 2:
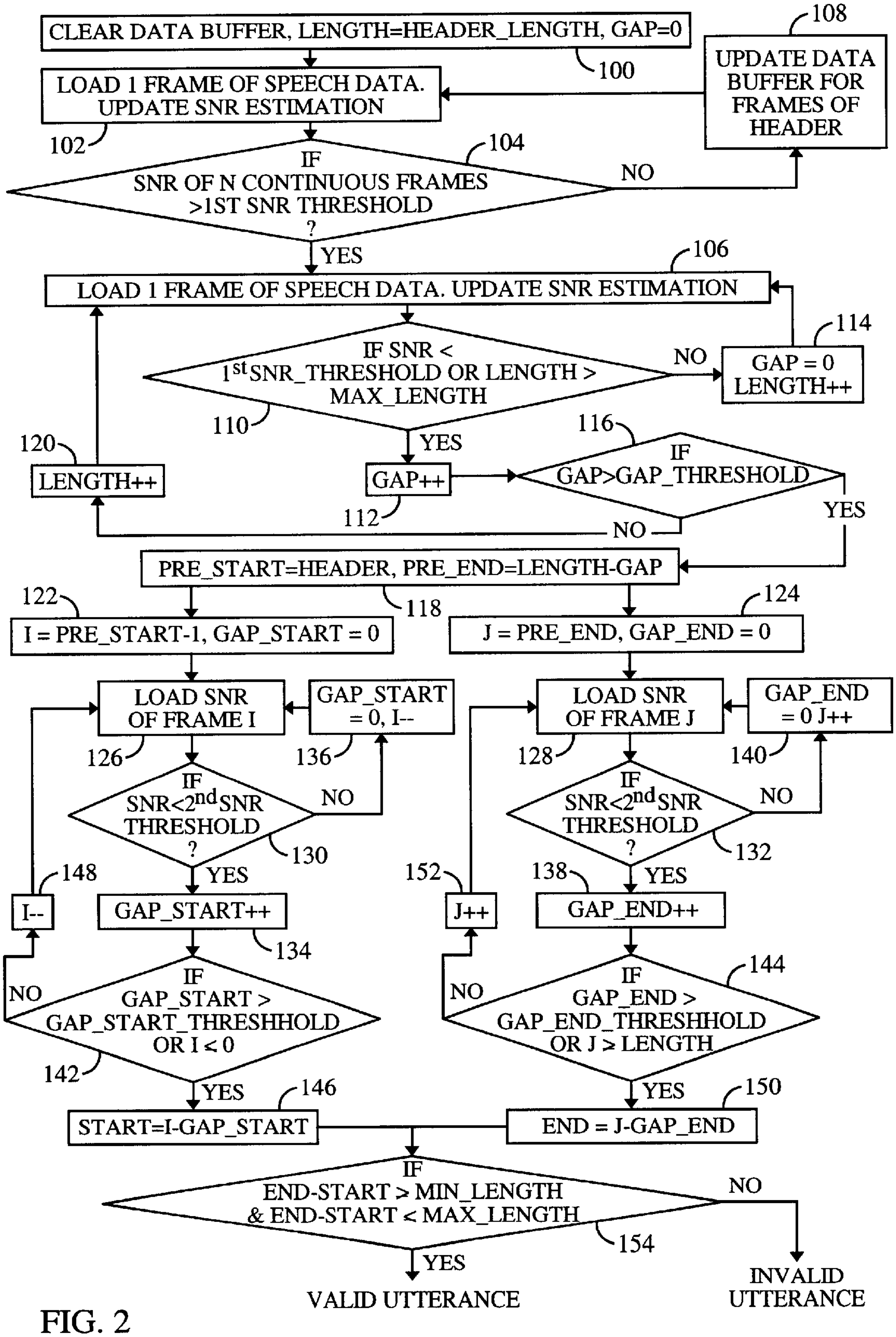
FIG. 2 is a flow chart illustrating method steps performed by a voice recognition system, such as the system of FIG. 1, to detect the endpoints of an utterance.

In accordance with one embodiment, an endpoint detector performs the method steps illustrated in the flow chart of FIG. 2 to detect the endpoints of an utterance. The algorithm steps depicted in FIG. 2 may advantageously be implemented with conventional digital signal processing techniques.

In step 100 a data buffer and a parameter called GAP are cleared. A parameter denoted LENGTH is set equal to a parameter called HEADER_LENGTH. The parameter called LENGTH tracks the length of the utterance whose endpoints are being detected. The various parameters may advantageously be stored in registers in the endpoint detector. The data buffer may advantageously be a circular buffer, which saves memory space in the event no one is talking. An acoustic processor (not shown), which includes the endpoint detector, processes speech utterances in real time at a fixed number of frames per utterance. In one embodiment there are ten milliseconds per frame. The endpoint detector must "look back" from the start point a certain number of speech frames because the acoustic processor (not shown) performs real-time processing. The length of HEADER determines how many frames to look back from the start point. The length of HEADER may be, e.g., from ten to twenty frames. After completing step 100, the algorithm proceeds to step 102.

In step 102 a frame of speech data is loaded and the SNR estimate is updated, or recalculated, as described below with reference to FIG. 4. Thus, the SNR estimate is updated every frame so as to be adaptive to changing SNR conditions. First and second SNR thresholds are calculated, as described below with reference to FIGS. 4–6. The first SNR threshold is higher than the second SNR threshold. After completing step 102, the algorithm proceeds to step 104.

In step 104 the current, or instantaneous, SNR is compared with the first SNR threshold. If the SNR of a predefined number, N, of continuous frames is greater than the first SNR threshold, the algorithm proceeds to step 106. If, on the other hand, the SNR of N continuous frames is not greater than the first threshold, the algorithm proceeds to step 108. In step 108 the algorithm updates the data buffer with the frames contained in HEADER. The algorithm then returns to step 104. In one embodiment the number N is three. Comparing with three successive frames is done for averaging purposes. For example, if only one frame were used, that frame might contain a noise peak. The resultant SNR would not be indicative of the SNR averaged over three consecutive frames.

In step 106 the next frame of speech data is loaded and the SNR estimate is updated. The algorithm then proceeds to step 110. In step 110 the current SNR is compared with the first SNR threshold to determine the endpoint of the utterance. If the SNR is less than the first SNR threshold, the algorithm proceeds to step 112. If, on the other hand, the SNR is not less than the first SNR threshold, the algorithm proceeds to step 114. In step 114 the parameter GAP is cleared and the parameter LENGTH is increased by one. The algorithm then returns to step 106.

In step 112 the parameter GAP is increased by one. The algorithm then proceeds to step 116. In step 116 the parameter GAP is compared with a parameter called GAP_THRESHOLD. The parameter GAP_THRESHOLD represents the gap between words during conversation. The parameter GAP_THRESHOLD may advantageously be set to 200 to 400 milliseconds. If GAP is greater than GAP_THRESHOLD, the algorithm proceeds to step 118. Also in step 116, the parameter LENGTH is compared with a parameter called MAX_LENGTH, which is described below in connection with step 154. If LENGTH is greater than or equal to MAX_LENGTH, the algorithm proceeds to step 118. However, if in step 116 GAP is not greater than GAP_THRESHOLD, and LENGTH is not greater than or equal to MAX_LENGTH, the algorithm proceeds to step 120. In step 120 the parameter LENGTH is increased by one. The algorithm then returns to step 106 to load the next frame of speech data.

In step 118 the algorithm begins looking back for the starting point of the utterance. The algorithm looks back into the frames saved in HEADER, which may advantageously contain twenty frames. A parameter called PRE_START is set equal to HEADER. The algorithm also begins looking for the endpoint of the utterance, setting a parameter called PRE_END equal to LENGTH minus GAP. The algorithm then proceeds to steps 122, 124.

Figure 3:
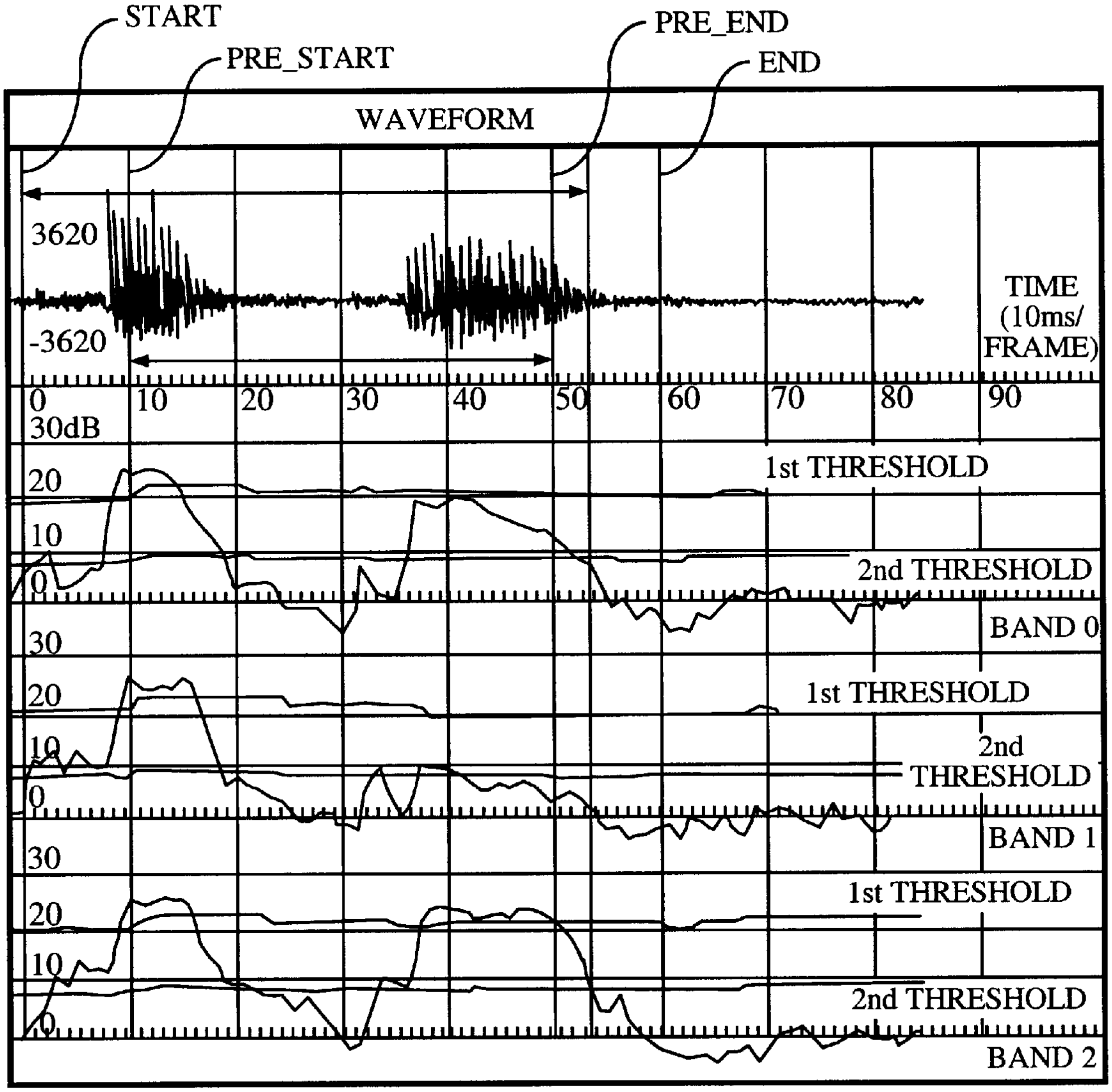

In step 122 a pointer i is set equal to PRE_START minus one, and a parameter called GAP_START is cleared (i.e., GAP_START is set equal to zero). The pointer i represents the starting point of the utterance. The algorithm then proceeds to step 126. Similarly, in step 124 a pointer j is set equal to PRE_END, and a parameter called GAP_END is cleared. The pointer j represents the endpoint of the utterance. The algorithm then proceeds to step 128. As shown in FIG. 3, a first line segment with arrows at opposing ends illustrates the length of an utterance. The ends of the line represent the actual starting and ending points of the utterance (i.e., END minus START). A second line segment with arrows at opposing ends, shown below the first line segment, represents the value PRE_END minus PRE_START, with the leftmost end representing the initial value of the pointer i and the rightmost end representing the initial value of the pointer j.

In step 126 the algorithm loads the current SNR of frame number i. The algorithm then proceeds to step 130. Similarly, in step 128 the algorithm loads the current SNR of frame number j. The algorithm then proceeds to step 132.

In step 130 the algorithm compares the current SNR of frame number i to the second SNR threshold. If the current SNR is less than the second SNR threshold, the algorithm proceeds to step 134. If, on the other hand, the current SNR is not less than the second SNR threshold, the algorithm proceeds to step 136. Similarly, in step 132 the algorithm compares the current SNR of frame number j to the second SNR threshold. If the current SNR is less than the second SNR threshold, the algorithm proceeds to step 138. If, on the other hand, the current SNR is not less than the second SNR threshold, the algorithm proceeds to step 140.

In step 136 GAP_START is cleared and the pointer i is decremented by one. The algorithm then returns to step 126. Similarly, in step 140 GAP_END is cleared and the pointer j is incremented by one. The algorithm then returns to step 128.

In step 134 GAP_START is increased by one. The algorithm then proceeds to step 142. Similarly, in step 138 GAP_END is increased by one. The algorithm then proceeds to step 144.

In step 142 GAP_START is compared with a parameter called GAP_START_THRESHOLD. The parameter GAP_START_THRESHOLD represents the gap between phonemes within spoken words, or the gap between adjacent words in a conversation spoken in quick succession. If GAP_START is greater than GAP_START_THRESHOLD, or if the pointer i is less than or equal to zero, the algorithm proceeds to step 146. If, on the other hand, GAP_START is not greater than GAP_START_THRESHOLD, and the pointer i is not less than or equal to zero, the algorithm proceeds to step 148. Similarly, in step 144 GAP_END is compared with a parameter called GAP_END_THRESHOLD. The parameter GAP_END_THRESHOLD represents the gap between phonemes within spoken words, or the gap between adjacent words in a conversation spoken in quick succession. If GAP_END is greater than GAP_END_THRESHOLD, or if the pointer j is greater than or equal to LENGTH, the algorithm proceeds to step 150. If, on the other hand, GAP_END is not greater than GAP_END_THRESHOLD, and the pointer j is not greater than or equal to LENGTH, the algorithm proceeds to step 152.

In step 148 the pointer i is decremented by one. The algorithm then returns to step 126. Similarly, in step 152 the pointer j is incremented by one. The algorithm then returns to step 128.

In step 146 a parameter called START, which represents the actual starting point of the utterance, is set equal to the pointer i minus GAP_START. The algorithm then proceeds to step 154. Similarly, in step 150 a parameter called END, which represents the actual endpoint of the utterance, is set equal to the pointer j minus GAP_END. The algorithm then proceeds to step 154.

In step 154 the difference END minus START is compared with a parameter called MIN_LENGTH, which is a predefined value representing a length that is less than the length of the shortest word in the vocabulary of the VR device. The difference END minus START is also compared with the parameter MAX_LENGTH, which is a predefined value representing a length that is greater than the longest word in the vocabulary of the VR device. In one embodiment MIN_LENGTH is 100 milliseconds and MAX_LENGTH is 2.5 seconds. If the difference END minus START is greater than or equal to MIN_LENGTH and less than or equal to MAX_LENGTH, a valid utterance has been captured. If, on the other hand, the difference END minus START is either less than MIN_LENGTH or greater than MAX_LENGTH, the utterance is invalid.

In FIG. 5, SNR estimates (dB) are plotted against instantaneous SNR (dB) for an endpoint detector residing in a wireless telephone, and an exemplary set of first and second SNR thresholds based on the SNR estimates is shown. If, for example, the SNR estimate were 40 dB, the first threshold would be 19 dB and the second threshold would be approximately 8.9 dB. In FIG. 6, SNR estimates (dB) are plotted against instantaneous SNR (dB) for an endpoint detector residing in a hands-free car kit, and an exemplary set of first and second SNR thresholds based on the SNR estimates is shown. If, for example, the instantaneous SNR were 15 dB, the first threshold would be approximately 15 dB and the second threshold would be approximately 8.2 dB.

In one embodiment, the estimation steps 102, 106 and the comparison steps 104, 110, 130, 132 described in connection with FIG. 3 are performed in accordance with the steps illustrated in the flow chart of FIG. 4. In FIG. 4, the step of estimating SNR (either step 102 or step 106 of FIG. 3) is performed by following the steps shown enclosed by dashed lines and labeled with reference numeral 102 (for simplicity). In step 200 a band energy (BE) value and a smoothed band energy value ($E^{SM}$) for the previous frame are used to calculate a smoothed band energy value ($E^{SM}$) for the current frame as follows:

$$E^{SM}=0.6E^{SM}+0.4BE$$

After the calculation of step 200 is completed, step 202 is performed. In step 202 a smoothed background energy value ($B^{SM}$) for the current frame is determined to be the minimum of 1.03 times the smoothed background energy value ($B^{SM}$) for the previous frame and the smoothed band energy value ($E^{SM}$) for the current frame as follows:

$$B^{SM}=\min(1.03B^{SM},\ E^{SM})$$

After the calculation of step 202 is completed, step 204 is performed. In step 204 a smoothed signal energy value ($S^{SM}$) for the current frame is determined to be the maximum of 0.97 times the smoothed signal energy value ($S^{SM}$) for the previous frame and the smoothed band energy value ($E^{SM}$) for the current frame as follows:

$$S^{SM}=\max(0.97S^{SM},\ E^{SM})$$

After the calculation of step 204 is completed, step 206 is performed. In step 206 an SNR estimate ($SNR^{EST}$) for the current frame is calculated from the smoothed signal energy value ($S^{SM}$) for the current frame and the smoothed background energy value ($B^{SM}$) for the current frame as follows:

$$SNR^{EST}=10\log_{10}(S^{SM}/B^{SM})$$

After the calculation of step 206 is completed, the step of comparing instantaneous SNR to estimated SNR ($SNR^{EST}$) to establish a first or second SNR threshold (either step 104 or step 110 of FIG. 3 for the first SNR threshold, or step 130 or either step 132 of FIG. 3 for the second SNR threshold) is performed by doing the comparison of step 208, which is enclosed by dashed lines and labeled with reference numeral 104 (for simplicity). The comparison of step 208 makes use of the following equation for instantaneous SNR ($SNR^{INST}$):

$$SNR^{INST}=10\log_{10}(BE/B^{SM})$$

Accordingly, in step 208 the instantaneous SNR ($SNR^{INST}$) for the current frame is compared with a first or second SNR threshold, in accordance with the following equation:

$$SNR^{INST}>\text{Threshold}(SNR^{EST})?$$

In one embodiment, in which a VR system resides in a wireless telephone, the first and second SNR thresholds may be obtained from the graph of FIG. 5 by locating the SNR estimate ($SNR^{EST}$) for the current frame on the horizontal axis and treating the first and second thresholds as the points of intersection with the first and second threshold curves shown. In another embodiment, in which a VR system resides in a hands-free car kit, the first and second SNR thresholds may be obtained from the graph of FIG. 6 by locating the SNR estimate ($SNR^{EST}$) for the current frame on the horizontal axis and treating the first and second thresholds as the points of intersection with the first and second threshold curves shown.

Instantaneous SNR ($SNR^{INST}$) may be calculated in accordance with any known method, including, e.g., methods of SNR calculation described in U.S. Pat. Nos. 5,742,734 and 5,341,456, which are assigned to the assignee of the present invention and fully incorporated herein by reference. The SNR estimate ($SNR^{EST}$) could be initialized to any value, but may advantageously be initialized as described below.

In one embodiment, in which a VR system resides in a wireless telephone, the initial value (i.e., the value in the first frame) of the smoothed band energy ($E^{SM}$) for the low frequency band (0.3–2 kHz) is set equal to the input signal band energy (BE) for the first frame. The initial value of the smoothed band energy ($E^{SM}$) for the high frequency band (2–4 kHz) is also set equal to the input signal band energy (BE) for the first frame. The initial value of the smoothed background energy ($B^{SM}$) is set equal to 5059644 for the low frequency band and 5059644 for the high frequency band (the units are quantization levels of signal energy, which is computed from the sum of squares of the digitized samples of the input signal). The initial value of the smoothed signal energy ($S^{SM}$) is set equal to 3200000 for the low frequency band and 320000 for the high frequency band.

In another embodiment, in which a VR system resides in a hands-free car kit, the initial value (i.e., the value in the first frame) of the smoothed band energy ($E^{SM}$) for the low frequency band (0.3–2 kHz) is set equal to the input signal band energy (BE) for the first frame. The initial values of the smoothed band energy ($E^{SM}$) for the middle frequency band (2–3 kHz) and the high frequency band (3–4 kHz) are also set equal to the input signal band energy (BE) for the first frame. The initial value of the smoothed background energy ($B^{SM}$) is set equal to 5059644 for the low frequency band, 5059644 for the middle frequency band, and 5059644 for the high frequency band. The initial value of the smoothed signal energy ($S^{SM}$) is set equal to 3200000 for the low frequency band, 250000 for the middle frequency band, and 70000 for the high frequency band.

Thus, a novel and improved method and apparatus for accurate endpointing of speech in the presence of noise has been described. The described embodiments advantageously either avoid false triggering of an endpoint detector by setting an appropriately high first SNR threshold value, or do not miss any weak speech segments by setting an appropriately low second SNR threshold value.

Those of skill in the art would understand that the various illustrative logical blocks and algorithin steps described in connection with the embodiments disclosed herein may be implemented or performed with a digital signal processor (DSP), an application specific integrated circuit (ASIC), discrete gate or transistor logic, discrete hardware components such as, e.g., registers and FIFO, a processor executing a set of firmware instructions, or any conventional programmable software module and a processor. The processor may advantageously be a microprocessor, but in the alternative, the processor may be any conventional processor, controller, microcontroller, or state machine. The software module could reside in RAM memory, flash memory, registers, or any other form of writable storage medium known in the art. Those of skill would further appreciate that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A device for detecting endpoints of an utterance in frames of a received signal, comprising:

a processor; and a software module executable by the processor to compare an utterance with a first threshold value to determine a first starting point and a first ending point of the utterance, compare with a second threshold value a part of the utterance that predates the first starting point to determine a second starting point of the utterance, and compare with the second threshold value a part of the utterance that postdates the first ending point to determine a second ending point of the utterance, wherein the first and second threshold values are calculated once per frame from a signal-to-noise ratio for the utterance.

2. The device of claim 1, wherein the first threshold value exceeds the second threshold value.

3. The device of claim 1, wherein a difference between the second ending point and the second starting point is constrained by predefined maximum and minimum length bounds.

4. A method of detecting endpoints of an utterance in frames of a received signal, comprising the steps of:

comparing an utterance with a first threshold value to determine a first starting point and a first ending point of the utterance;

comparing with a second threshold value a part of the utterance that predates the first starting point to determine a second starting point of the utterance; and comparing with the second threshold value a part of the utterance that postdates the first ending point to determine a second ending point of the utterance, wherein the first and second threshold values are calculated once per frame from a signal-to-noise ratio for the utterance.

5. The method of claim 4, wherein the first threshold value exceeds the second threshold value.

6. The method of claim 4, further comprising the step of constraining a difference between the second ending point and the second starting point by predefined maximum and minimum length bounds.

7. A device for detecting endpoints of an utterance in frames of a received signal, comprising:

means for comparing an utterance with a first threshold value to determine a first starting point and a first ending point of the utterance;

means for comparing with a second threshold value a part of the utterance that predates the first starting point to determine a second starting point of the utterance; and means for comparing with the second threshold value a part of the utterance that postdates the first ending point to determine a second ending point of the utterance, wherein the first and second threshold values are calculated once per frame from a signal-to-noise ratio for the utterance.

8. The device of claim 7, wherein the first threshold value exceeds the second threshold value.

9. The device of claim 7, further comprising means for constraining a difference between the second ending point and the second starting point by predefined maximum and minimum length bounds.

10. A voice recognition system, comprising:

an acoustic processor configured to determine parameters of an utterance contained in received frames of a speech signal, the acoustic processor including an endpoint detector configured to compare the utterance with a first threshold value to determine a first starting point and a first ending point of the utterance, compare with a second threshold value a part of the utterance that predates the first starting point to determine a second starting point of the utterance, and compare with the second threshold value a part of the utterance that postdates the first ending point to determine a second ending point of the utterance, wherein the first and second threshold values are calculated once per frame from a signal-to-noise ratio for the utterance;

pattern comparison logic coupled to the acoustic processor and configured to compare stored word templates with parameters associated with the utterance; and a database coupled to the pattern comparison logic and configured to store the word templates.

11. The voice recognition system of claim 10, further comprising decision logic coupled to the pattern comparison logic and configured to decide which word template most closely matches the parameters.

12. The voice recognition system of claim 10, wherein the first threshold value exceeds the second threshold value.

13. The voice recognition system of claim 12, wherein a difference between the second ending point and the second starting point is constrained by predefined maximum and minimum length bounds.

* * * * *